No. 736,666. PATENTED AUG. 18, 1903.
A. WOOD.
WATER GAGE FOR STEAM GENERATORS.
APPLICATION FILED JUNE 20, 1902.
NO MODEL.
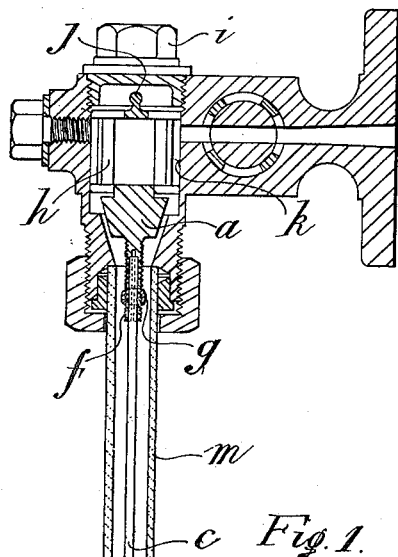
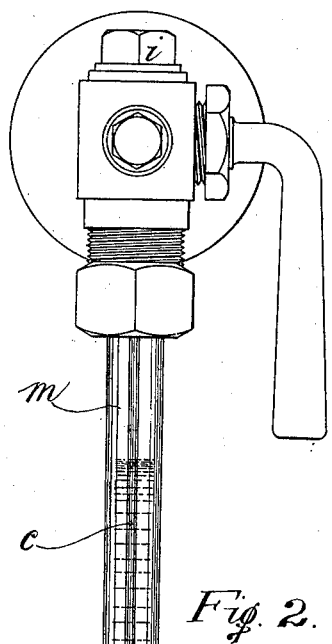
Fig. 1.
Fig. 2.
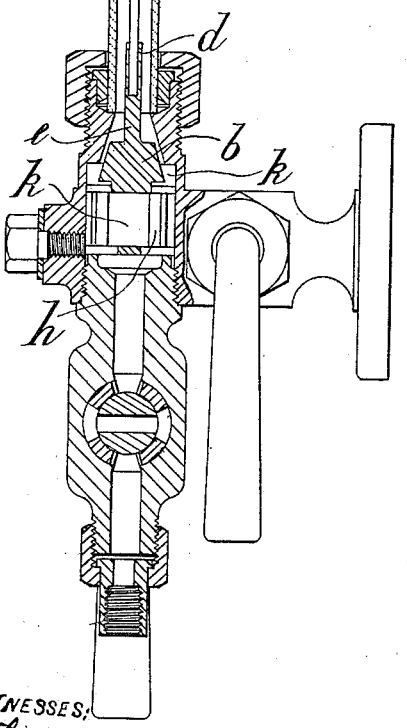
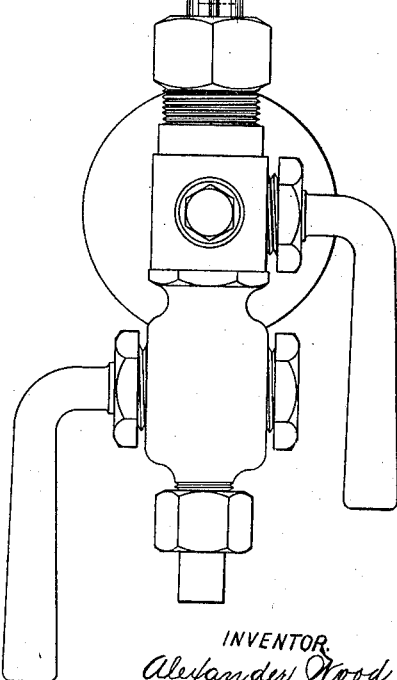
WITNESSES:
INVENTOR.
Alexander Wood
BY
ATTORNEYS.
THE NORRIS PETERS CO., PHOTO-LITHO., WASHINGTON, D. C.

No. 736,666. Patented August 18, 1903.

UNITED STATES PATENT OFFICE.

ALEXANDER WOOD, OF GLASGOW, SCOTLAND.

WATER-GAGE FOR STEAM-GENERATORS.

SPECIFICATION forming part of Letters Patent No. 736,666, dated August 18, 1903.

Application filed June 20, 1902. Serial No. 112,492. (No model.)

*To all whom it may concern:*

Be it known that I, ALEXANDER WOOD, director, a subject of the King of Great Britain, residing at Woodlands, Partick, Glasgow, Scotland, have invented certain new and useful Improvements in Water-Gages for Steam-Generators, of which the following is a specification.

This invention relates to that class of water-gages for steam-generators known as "safety-gages." In this class of water-gage should the glass break from any cause whatever automatic valve arrangements come into action and prevent the escape of water and steam from the boiler.

My invention has for its object to improve and simplify the construction of such safety-gages.

The essential feature of this invention is that the valves are normally retained in the open position by means of a rod made of glass, porcelain, or other material which can be readily broken. The valves may be made of any suitable construction and are so arranged and fitted that they will automatically close whenever the glass or other rod is broken. Preferably the valves would be conical and the upper one arranged so as to close by the pressure of the steam while the lower one may be arranged to close by the pressure of the water merely or by means of a spring, weighted lever, or such like. The glass or other rod is arranged within the gage-glass and could be seated at each end in a cup or socket on an extension formed on each valve.

In order that my said invention may be properly understood, I have hereunto appended an explanatory drawing, which shows, by way of example, a convenient method of carrying out the invention.

Figure 1 is a vertical section, and Fig. 2 an elevation, of a water-gage having my invention applied thereto.

The water-gage, which is provided with self-closing valves and may be otherwise of any usual construction, has the valves $a$ $b$ retained in the open position, as shown at Fig. 1, by means of a slender glass rod $c$. This rod at its lower end is inserted in a socket $d$, made in an extension $e$ of the valve $b$, and at its upper end is inserted in a split and externally-screwed and slightly-tapered socket extension $f$, made on the valve $a$. A small nut $g$ is screwed on the extension $f$, so as to tighten the latter and cause it to grip the rod. Each valve is of conical shape and closes on a corresponding seat, as shown.

An open guide-frame $h$ is secured to or made one with each valve, and this frame fits slidably into the cylindrical bore or passage $k$ and constitutes a guide for the valve. The upper guide-frame is provided with a small knob $j$, whereby it, along with the valve $a$ and rod $c$, can be raised up out of place after removing the screw-plug $i$.

In practice I have found that with a boiler working at a pressure of one hundred pounds to the square inch a glass rod of one-eighth inch diameter is quite sufficient to hold the valves normally open. When the gage-glass $m$ is broken from any cause, the pressure of the steam and water acting on the valve $a$ $b$ simply crushes up the glass rod and instantaneously closes the valves tight, so that steam and hot water cannot escape from the boiler.

Instead of using a glass rod, as before described, a metal or other rod capable of bending up under the pressure of the steam and water whenever the gage-glass is broken may be employed. This rod would be made sufficiently rigid to normally hold the valves open; but whenever the gage-glass broke it would bend up sufficiently to allow the valves to close down on their seats.

Having now fully described my invention, what I claim, and desire to secure by Letters Patent, is—

1. In a water-gage having a gage-glass and valves capable of closing automatically the combination with the valves of a rod made of a material which will readily break under pressure but which will not be affected by heat or moisture for the purpose of normally retaining the valves in the open position, said rod being made solid throughout its length and being arranged within the gage-glass.

2. In a water-gage, the combination of a gage-glass, a self-closing steam-valve, a self-closing water-valve, a socket extension on the steam-valve, a socket extension on the water-valve, and a continuous glass rod arranged within the gage-glass and fitted in the socket extensions so as to retain the valves in the open position, substantially as described.

3. In a water-gage, the combination of a gage-glass self-closing steam-valve, a self-closing water-valve, an externally-screwed socket extension on the steam-valve, a socket extension on the water-valve, and a continuous glass rod arranged within the gage-glass and fitted in the socket extensions so as to retain the valves in the open position, substantially as described.

4. In a water-gage, the combination of a conical self-closing steam-valve, a guide-frame on the valve, a knob on the guide-frame, a socket extension on the valve, a conical self-closing water-valve, a guide-frame on the valve, a socket extension on the valve and a breakable rod fitted in the socket extension and which retains the valves in the open position, substantially as described.

5. In combination, the valve $a$, the guide $h$ on the valve, the knob $j$, the socket extension $f$, the valve $b$, the guide $h$ on the valve, the socket extension $d$, $e$, and the rod $c$, substantially as hereinbefore described and shown.

6. In a water-gage, the combination of a gage-glass, a self-closing steam-valve, a self-closing water-valve and a solid continuous glass rod arranged within the gage-glass for normally retaining these valves in the open position.

Signed at Glasgow, Scotland, this 9th day of June, 1902.

ALEX. WOOD.

Witnesses:
WILLIAM GALL,
H. D. FITZPATRICK.